Oct. 9, 1945.  R. P. WIPPEL  2,386,378
TRACTOR PLOW
Filed April 29, 1944  2 Sheets-Sheet 1
Fig. 1.
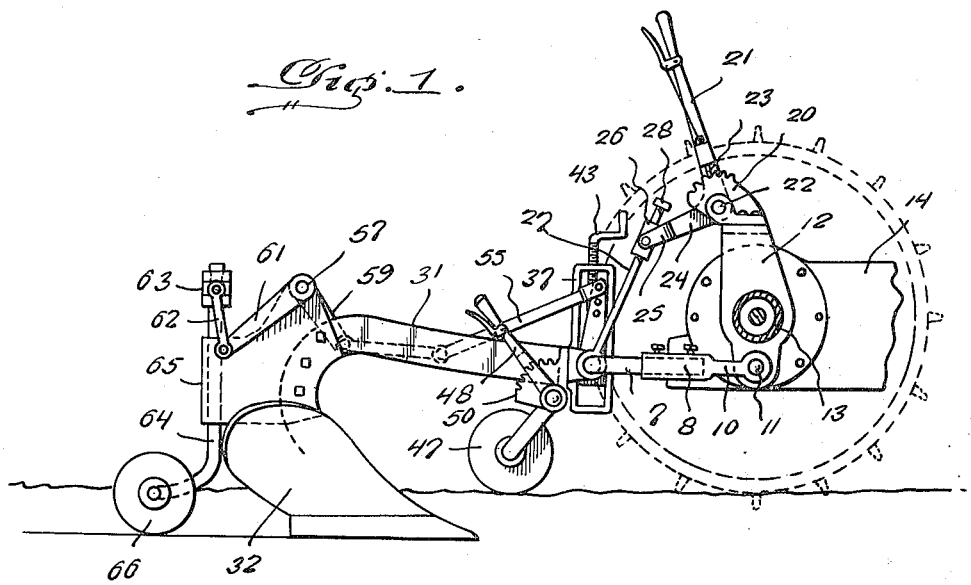
Fig. 2.
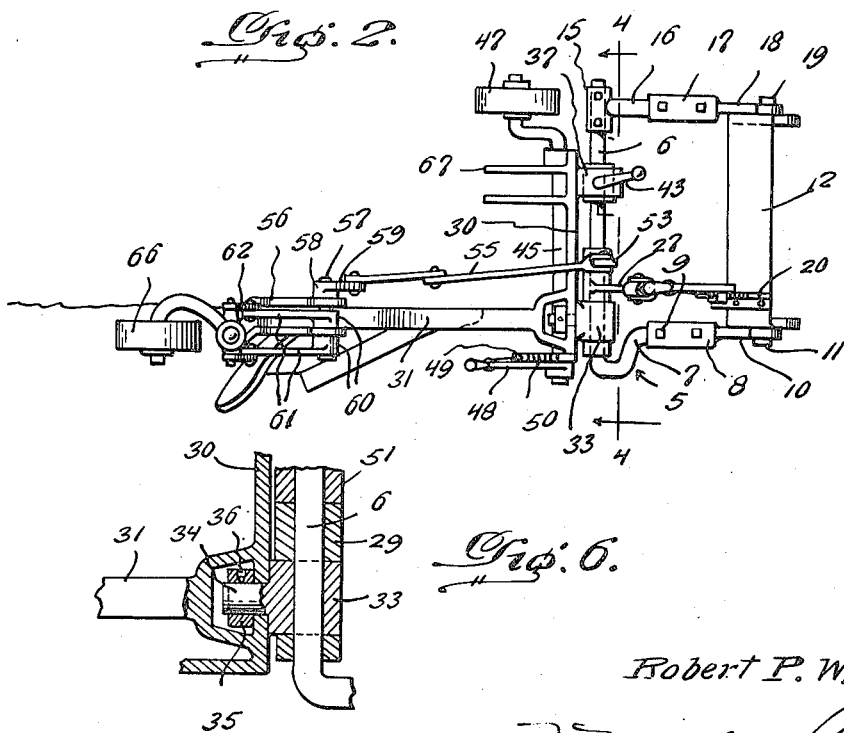
Fig. 6.
Inventor
Robert P. Wippel,
By McMorrow & Berman
Attorneys Oct. 9, 1945.  R. P. WIPPEL  2,386,378
TRACTOR PLOW
Filed April 29, 1944  2 Sheets-Sheet 2

Inventor
Robert P. Wippel,
By McMorrow & Berman
Attorneys

Patented Oct. 9, 1945

2,386,378

UNITED STATES PATENT OFFICE 2,386,378

TRACTOR PLOW

Robert P. Wippel, Kansas City, Kans.

Application April 29, 1944, Serial No. 533,366

3 Claims. (Cl. 97—47)

The present invention relates to new and useful improvements in plows and more particularly to a plow adapted to be connected with a power driven tractor.

An important object of the present invention is to provide a plow of this character embodying means whereby the desired adjustment may be made for plowing the furrow at a desired depth, also for leveling the plow and means for moving the plow into and out of contact with the ground, when desired.

A further object of the invention is to provide a plow attachment of this character which may be conveniently attached and detached from a conventional type of tractor and which at the same time is simple and practical in construction, strong and durable and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1 is a side elevational view showing the plow in its lowered position.

Figure 2 is a top plan view of the plow detached from the tractor.

Figure 3 is a side elevational view showing the plow in its raised position.

Figure 4 is a transverse sectional view taken substantially on the line 4—4 of Figure 2.

Figure 5 is a vertical sectional view taken on the line 5—5 of Figure 4, and

Figure 6 is a fragmentary enlarged sectional view showing the pivotal mounting for one side of the plow frame.

Referring now to the drawings in detail wherein for the purpose of illustration I have disclosed a preferred embodiment of the invention, the numeral 5 designates a tractor hitch generally which comprises a transverse shaft 6 having one end bent angularly, as shown at 7, and secured in a socket 8 by means of set screws 9, the socket being formed on the rear end of an arm 10 pivotally secured at its forward end on a pin 11 carried at the lower end of an inverted U shaped bracket 12 which is fixedly secured on the axle housing 13 of a tractor 14 of conventional construction.

To the other end of the shaft 6 is secured a collar 15 from which projects a forwardly extending arm 16 also secured in a socket 17 on an arm 18 which is secured to the opposite side of the bracket 12 by means of the pivot pin 19.

To the upper portion of the bracket 12 is secured a toothed segment 20 to which a hand lever 21 is pivoted by a pin 22, the lever having a dog 23 engageable with the teeth of the segment to secure the lever in adjusted position. An arm 24 extends from the pivoted end of the lever in a rearward direction and is formed with a yoke 25 at its rear end to which is pivoted a collar 26 slidably mounted on a rod 27 having a head 28 at its upper end forming a stop for the collar. The lower end of the rod 27 is formed with a collar 29 which is freely mounted on the shaft 6, the shaft thus being raised or lowered through the manipulation of the hand lever 21.

A plow frame 30 extends parallel to the shaft 6 having a plow beam 31 extending rearwardly from one end of the frame, the beam having a plow 32 at its rear end. A collar 33 is freely mounted on the shaft 6 having a trunnion 34 projecting rearwardly therefrom through an opening in the frame 30 adjacent one end of the latter to permit pivotal movement of the frame on the trunnion, the trunnion being secured in position by a collar 35 and set screw 36.

Secured to the front edge of the plow frame 30 adjacent its opposite end is a vertically elongated guide 37 of open frame construction and including vertically spaced walls connected by a top section 38.

A collar 39 is freely mounted on the shaft 6 having a socket 40 in its upper portion swivelly receiving a ball 41 formed on the lower end of a screw 42 which is threaded through the top 38. The upper end of the screw is formed with a handle 43 for turning the screw whereby to vertically adjust the adjacent end of the shaft 6.

Spaced bearings 44 are formed on the lower edge of the plow frame 30 in which a shaft 45 is rotatably carried, one end of the shaft being offset, as shown at 46, and having a ground wheel 47 journaled thereon. To the other end of the shaft 45 is secured a hand lever 48 provided with a dog 49 engageable with the teeth of a segment 50 secured to the frame 30 for securing the lever in a predetermined position. Through the manipulation of the lever 48 the wheel 47 may be raised or lowered with respect to the ground independently of the raising or lowering of the plow frame 30 by means of the lever 21.

A collar 51 is secured on the shaft 6 by means of a set screw 52, the collar having an arm 53 extending upwardly therefrom and having a plurality of openings 54 at its upper end for adjustably connecting one end of a sectional rod 55 thereto.

A bracket 56 is secured to the rear portion of the plow beam 31 in the upper edge of which is journaled a transverse pin 57 having a collar 58 secured thereto and formed with a downwardly and forwardly extending arm 59 and to the lower end of which the rear end of the rod 55 is pivotally attached.

A pair of collars 60 are also secured to the pin 57 and from which arms 61 extend rearwardly and downwardly in spaced parallel relation. To the rear ends of the arms 61 are pivotally attached links 62 which extend upwardly and have their upper ends pivotally attached at opposite sides of a collar 63 secured to the upper end of a post 64 slidably and rotatably journaled in a bearing 65 at the rear edge of the bracket 56. The lower end of the post 64 is bent to form an axle on which a ground wheel 66 is journaled, the wheel 66 being positioned immediately behind the plow 32.

Extending rearwardly from the plow frame 30, adjacent the end thereof opposite from the plow beam 31, is a pair of spaced parallel brackets 67 to which the plow beam of a second plow may be attached, if desired, the second plow having a rear wheel attached thereto similar to the wheel 66 and operatively connected to the shaft 6 in the same manner for raising and lowering movement.

In the operation of the device, it will be apparent that by reason of the pivotal connection of the shaft 6 on the pins 11 and 19 that the shaft 6 may be raised or lowered through the lever 21, arm 24 and rod 27, whereby the front end of the plow beam 31 will be likewise raised or lowered.

The swinging of the shaft 6 about the axis of the pins 11 and 19 will cause a movement of the arm 54 from the position shown in Figure 1 to that shown in Figure 3 whereby to exert a pulling force on the sectional rod 55 which will rotate the pin 57 so as to swing the arm 61 downwardly and thus lower the post 64 on which the rear wheel 66 is carried, thereby raising the plow 32 out of its furrow and above the surface of the ground as shown in Figure 3 and the plow may thus travel over the ground out of engagement therewith.

The wheel 47 constitutes a depth gauge for the plow which is adjusted through the lever 48.

The plow frame may be tilted through the manipulation of the screw 42 and by means of which one end of the frame 30 may be raised or lowered relative to the shaft 6.

It is believed the details of construction, operation and advantages of the device will be readily understood from the foregoing without further detailed explanation.

Having thus described the invention, what I claim is:

1. Means for attaching a plow to a tractor and comprising a transverse shaft, means pivotally connecting the ends of the shaft to the tractor for vertical swinging movement, a transversely extending frame member carried by the front end of the plow, means for tiltably connecting the frame member to the shaft and also for bodily movement with the shaft, a vertically adjustable gage wheel supporting the frame member and shaft, a vertically adjustable ground wheel behind the plow, and means connecting the last named wheel to the shaft and operable to raise and lower the ground wheel in accordance with the vertical movement of the shaft.

2. Means for attaching a plow to a tractor and comprising a transverse shaft, means pivotally connecting the ends of the shaft to the tractor for vertical swinging movement, a transversely extending frame member carried by the front end of the plow, means for tiltably connecting one end of the frame member to the shaft, vertical adjusting means between the other end of the frame member and the shaft, a vertically adjustable ground wheel behind the plow, and means connecting the wheel to the shaft and operable to raise and lower the wheel in accordance with the vertical movement of the shaft.

3. Means for attaching a plow to a tractor and comprising a transverse shaft, means pivotally connecting the ends of the shaft to the tractor for vertical swinging movement, manual means for raising the shaft and including a loose connection providing for free gravitating movement of the shaft, a transversely extending frame member at the front end of the plow, means tiltably connecting one end of the frame member to the shaft, vertical adjusting means between the other end of the frame member and the shaft, a gage wheel adjustably mounted at said last named end of the frame member, a vertically adjustable ground wheel behind the plow, and means connecting the ground wheel to the shaft and operable to raise and lower the plow relative to the ground wheel in accordance with the vertical movement of the shaft.

ROBERT P. WIPPEL.